US012346833B1

(12) United States Patent
Watumull et al.

(10) Patent No.: US 12,346,833 B1
(45) Date of Patent: Jul. 1, 2025

(54) SYSTEMS AND METHODS FOR ARTIFICIAL INTELLIGENCE—AND MACHINE LEARNING-BASED EVALUATIONS AND EXPLANATIONS OF PROBLEMS

(71) Applicant: Oceanit Laboratories, Inc., Honolulu, HI (US)

(72) Inventors: Jeffrey Watumull, Honolulu, HI (US); Christopher Sullivan, Honolulu, HI (US); Matthew Williams, Honolulu, HI (US); Patrick Sullivan, Kailua, HI (US); Ken Cheung, Kailua, HI (US); Noam Chomsky, Tucson, AZ (US)

(73) Assignee: Oceanit Laboratories, Inc., Honolulu, HI (US)

( * ) Notice: Subject to any disclaimer, the term of this patent is extended or adjusted under 35 U.S.C. 154(b) by 585 days.

(21) Appl. No.: 17/152,705

(22) Filed: Jan. 19, 2021

Related U.S. Application Data

(60) Provisional application No. 62/962,905, filed on Jan. 17, 2020.

(51) Int. Cl.
| | |
|---|---|
| *G06N 3/126* | (2023.01) |
| *G06N 3/084* | (2023.01) |
| *G06N 5/045* | (2023.01) |
| *G06N 7/01* | (2023.01) |
| *G06N 20/00* | (2019.01) |

(52) U.S. Cl.
CPC ............ *G06N 5/045* (2013.01); *G06N 3/126* (2013.01); *G06N 7/01* (2023.01)

(58) Field of Classification Search
CPC ........... G06N 5/045; G06N 3/126; G06N 7/01
See application file for complete search history.

(56) References Cited

U.S. PATENT DOCUMENTS

| | | | | |
|---|---|---|---|---|
| 8,959,019 B2 * | 2/2015 | Printz | .................... | G10L 15/02 704/243 |
| 2009/0198759 A1 * | 8/2009 | Schmieder | ............... | G06G 7/02 706/56 |
| 2010/0323708 A1 * | 12/2010 | Kozat | .................... | H04L 5/003 455/450 |
| 2015/0186504 A1 * | 7/2015 | Gorman | .................. | G06F 40/30 707/752 |

(Continued)

OTHER PUBLICATIONS

R. Lorenz et al., "ViennaRNA Package 2.0," Algorithms for Molecular Biology 6:26 (2011).

(Continued)

*Primary Examiner* — Brandon S Cole
(74) *Attorney, Agent, or Firm* — Fresh IP PLC; Clifford D. Hyra; Aubrey Y. Chen

(57) ABSTRACT

The present invention is generally directed to artificial intelligence (AI) systems and materials. In particular, the invention relates to human-like AI that utilizes a symbolic thinking engine to create explanatory theories. Such theories are based on an iterative process that adjusts for available information, context, and/or perspective, and can be created based on sparse information. The invention then iterates to return a useful result that can also be predictive. In one or more embodiments, the present invention is modular and scalable, enabling the addition of multiple domains that collaborate in parallel, similar to how the human mind/brain is believed to work.

23 Claims, 11 Drawing Sheets

(56) References Cited

U.S. PATENT DOCUMENTS

| | | | | |
|---|---|---|---|---|
| 2016/0300566 A1* | 10/2016 | Hofer | ...................... | G10L 15/08 |
| 2018/0276278 A1* | 9/2018 | Cagan | .................... | G06N 20/00 |
| 2018/0357221 A1* | 12/2018 | Galitsky | ............... | G06F 40/289 |
| 2019/0236464 A1* | 8/2019 | Feinson | .................... | G06N 5/04 |
| 2020/0175961 A1* | 6/2020 | Thomson | ................ | G10L 15/28 |

OTHER PUBLICATIONS

M. Zuker, "Mfold web server for nucleic acid folding and hybridization prediction," Nucleic acids research 31.13 (2003): 3406-3415.

M. Andronescu et al., "RNA Strand: the RNA secondary structure and statistical analysis database," BMC bioinformatics 9.1 (2008): 340.

J. Anderson-Lee et al., "Principles for predicting RNA secondary structure design difficulty," Journal of molecular biology 428.5 (2016): 748-757.

C.B. Browne et al., "A survey of Monte Carlo tree search methods," IEEE Transactions on Computational Intelligence and AI in games 4.1 (2012): 1-43.

H.M. Pandey et al., "Genetic algorithms: concepts, issues and a case study of grammar induction," Proceedings of the CUBE International Information Technology Conference (2012).

B. Knudsen et al., "RNA secondary structure prediction using stochastic context-free grammars and evolutionary history," Bioinformatics (Oxford, England) 15.6 (1999): 446-454.

J. Talton et al., "Learning design patterns with Bayesian grammar induction," Proceedings of the 25th Annual ACM Symposium on User Interface Software and Technology (2012).

\* cited by examiner

SYSTEMS AND METHODS FOR ARTIFICIAL INTELLIGENCE—AND MACHINE LEARNING-BASED EVALUATIONS AND EXPLANATIONS OF PROBLEMS

CROSS-REFERENCE TO RELATED APPLICATIONS

This application claims priority to U.S. Provisional Application No. 62/962,905 filed Jan. 17, 2020, which is hereby incorporated by reference in its entirety.

FIELD OF THE INVENTION

The application relates generally to systems and methods for artificial intelligence (AI) and machine learning (ML). In particular, the application relates to AI systems and methods that utilize a symbolic thinking engine to create explanatory theories to explain a problem of interest.

BACKGROUND

As of 2020, artificial intelligence (AI) or statistical machine learning (ML) systems have become common in everyday life. In particular, AI and/or ML has become common in applications such as computer vision, where it is used to recognize and classify objects, game playing, which includes systems such as AlphaGo, and other more practical applications such as fraud and malware detection. However, ML has not penetrated to all applications. Specifically, they are not commonly used in mission critical settings where accurate predictions and constant human oversight is a requirement or applications where data are costly (either financially or temporally) to obtain.

While there are numerous reasons for why ML has not gained traction in these areas, many of them can be simplified to three key limitations of current ML systems. First, current ML systems and particularly those using neural network architectures are data intensive, and they can require thousands or millions of samples to train effectively. As a result, such systems cannot be used with any degree of confidence in settings where such data are unavailable or extremely costly to obtain. Second, typical ML systems produce black-box models that produce predictions, but they are not able to explain how those predictions were generated. For example, neural networks generate predictions using mathematical formulas that are typically far too long and complex for a human observer to understand and validate. Because of this, it is impossible for humans to provide oversight as there is not enough information about the decision process for a human to support/reject the machine. Third, ML systems do not consider the context of where they are being applied, and therefore are incapable of understanding when their predictions are valid or invalid. As a result, they may become inaccurate or be applied inappropriately if familiar inputs are provided in an unfamiliar context. There is ongoing research focused in all three areas, but currently-available ML system mitigates all three limitations.

The easy availability of the computational power needed to train ML systems is a relatively recent innovation. Previously, symbolic AI systems, which leveraged human provided information in the form of "symbols" (i.e., building blocks), which are also referred to as symbols, and "rules" that describe how these symbols can be arranged to make decisions. For example, a symbolic AI system that distinguishes cats from dogs may have symbols for "animal," "four legs," and "meow." With these symbols, an unknown entity is a cat if it is an animal, has four legs, and meows. One advantage of such symbolic approaches is that the rules employed to solve problems are explicit, deterministic, and human-like (i.e., they are both intelligible to humans and resemble the rules that cognitive science has discovered the human mind/brain uses subconsciously to solve such problems). However, because these approaches are not data driven, a human subject matter expert must create the symbols and their corresponding rules for every new application of the system.

Given the foregoing, there exists a significant need for alternative artificial intelligences approaches and systems that are neither as labor intensive as the "classical" symbolic AI systems nor as data hungry and opaque as the current generation of ML systems. In particular, needs exist for systems and methods that utilize AI and/or ML to produce accurate predictions from a limited amount of data in an explanatory and traceable fashion. Such systems and methods would be useful in multiple contexts, including, but not limited to, design problems (e.g., designing new RNA/DNA sequences with desired properties) where each additional data collection run is costly, and "mission critical" applications such as flight or industrial control systems where human oversight is required and the consequences/cost of failure is high.

SUMMARY

It is to be understood that both the following summary and the detailed description are exemplary and explanatory and are intended to provide an explanation of the invention as claimed. Neither the summary nor the description that follows is intended to define or limit the scope of the invention to the particular features mentioned in the summary or in the description.

In certain embodiments, the disclosed automated systems and methods for assessing and valuating property may include one or more of the features described herein.

Embodiments of the described invention comprise a system based on AI and/or ML that solves design and/or decision support problems and further reasons in a "human style," as defined by cognitive theory. Accordingly, the present invention produces results that are more tractable and explanatory and require fewer samples of data to operate, thus overcoming the limitations of the prior art. In particular, the invention constructs a causal explanatory theory iteratively by generating potential explanations of data and filtering/modifying those explanations when provided with data that show the explanation to be inadequate. The knowledge to construct these theories is provided in part by a human for a single domain, which is implemented as a module. When presented with a more general problem, the invention in various embodiments distinguishes between modules using the context in which the data were obtained.

The invention in one or more embodiments comprises the following general, non-limiting features: (1) creating one or more explanatory theories that can later be used for system design and/or decision support purposes; (2) deciding on the best explanation/explanatory theory; (3) operating efficiently on sparse data; (4) generating causal models; (5) having a modular construction; and (6) having a symbolic thinking engine. Each of these features is described briefly below.

The first non-limiting feature of the invention in its various embodiments is the ability to create one or more explanatory theories. In this context, an explanatory theory is a hierarchical arrangement of symbols intended to explain data that have been provided to the system. The hierarchical combination of symbols that comprise an explanatory theory differs from how models of data are defined in ML systems. The need for this organization, as opposed to vectors of model "weights," is to ensure that the AI system is rational, i.e., its conclusions follow from a causal theory and/or model that the AI system itself constructs. Moreover, this explicit, explanatory causal theory ensures that a human user can interpret the model as a whole along with its subcomponents. A skilled artisan will appreciate that one or more explanatory theories can be considered simultaneously and may be modified and/or refined as new data and contexts are encountered.

A second non-limiting feature of the invention in its various embodiments is the mechanism by which explanatory theories are created. Typical ML methods in the art treat the problem of identifying the best model (the nearest equivalent of the present invention's explanatory theory) over a set of weights. Methods embodied in the present invention are more human-like and inspired by the scientific process of problem solving. A set of explanatory theories are generated and each explanatory theory is judged on how well they explain the data provided. Explanatory theories that fail to explain the data are either rejected or marked for modification in subsequent iterations. Explanatory theories that perform well are retained and subjected to larger quantities of data (if available) in an attempt to "break" them (i.e., test them by finding counter-examples in the data where they perform poorly).

A third non-limiting feature of the invention in its various embodiments is the capability to operate efficiently on sparse data. As mentioned previously herein, one of the limitations of current, state-of-the-art ML systems is the requirement of a large training data set. The present invention utilizes data to iteratively constructs explanatory theories using the aforementioned combinations of user-defined symbols. Because these symbols and rules integrate human knowledge about the application area, the invention in its various embodiments is naturally capable of coping with problems having limited amounts of data. Furthermore, the invention in one or more embodiments builds explanatory theories from the "bottom up," which naturally promotes simple explanatory theories over more complex ones and avoids overfitting (i.e., a model that is overspecialized to a set of data and can accurately describe samples from the dataset but does not generalize.

A fourth non-limiting feature of the invention in its various embodiments is causal reasoning. Existing state-of-the-art systems focus on "what" questions (e.g., what type of object is this), but cannot answer "how" and "why" questions. The instant invention allows "how" and "why" questions to be answered by integrating that information in the symbols that comprise the explanatory theories as well as the search process used to construct the theory. Such an approach is in contrast to currently-available approaches that rely solely on mathematical transforms, which are powerful but unable to represent higher-level ideas.

A fifth non-limiting feature of the invention in its various embodiments is modularity, which enables a pathway to scale from single domain applications to a broader set. As stated previously herein, the user must provide some level of knowledge, such as a set of symbols used in the thinking engine along with those aspects of a "good" explanatory theory that are specific to a domain, which is encapsulated in a module for a domain. By identifying the context of a problem, the invention in various embodiments is capable of identifying which submodules are most appropriate, thereby avoiding the need for a monolithic database containing all facts.

A sixth non-limiting feature of the invention in its various embodiments is the presence of a symbolic thinking engine. One with skill in the art will recognize that most ML systems use a single model with many parameters to represent a system. A symbolic thinking engine is responsible for combining the symbols in a module in order to generate and refine an explanatory theory. The symbolic thinking engine of the present invention has three major components: (1) the workspace component, which contains the data available to the system, and, if available, mechanisms for obtaining new data, (2) the syntax component, which contains the symbols and rules that are used to construct explanatory theories, and (3) the search component which guides the system towards models that appear most promising. As part of the search process, the symbolic thinking engine may use multiple sets of symbols taken from different domain modules if there is uncertainty about the correct context for the data.

Purely as a non-limiting example, the user supplies a syntax and data from the target system, and may also supply data from related problems. If data from related problems are available, they are used to update the formal syntax by identifying the rules and symbols that are most commonly used. Otherwise, the user-supplied defaults are used. The search module is then used to find the combination of symbols in the syntax that best describes the target data. This is accomplished by the search procedure explicitly determining a subset of the symbols in the target model. A skilled artisan will realize that exhaustively searching all possible combinations of symbols is impractical; therefore, the syntax is used to "fill in" those symbols not yet determined by the search procedure. This process continues until either (1) a model is identified that explains the data well enough for the user's specific purposes, (2) a user-determined computational budget is expended, or (3) all possible combinations have been checked, which is possible in toy problems but not in practice.

Embodiments of the present invention provide AI systems and methods that have several advantages over the current art, including, as non-limiting examples: (1) making and continuously improving explanations with more information, context, or perspectives; (2) developing explanations in a traceable manner for further analysis by subject matter experts; (3) human-like, analogical reasoning; (4) human-level linguistic competence; (5) human-style common sense knowledge; (6) operating successfully given sparse data; (7) reasoning successfully about causes and distinguishing said causes from correlations; and (8) being extensible to multiple domains.

In at least one embodiment of the present invention, an artificial intelligence (AI) system is disclosed. The system comprises at least one display; at least one processing component; one or more input and/or output components; and at least one memory component comprising a volatile memory component and a non-volatile memory component, the at least one memory component operatively connected to the at least one processing component; wherein the at least one display outputs data processed by the at least one processing component; wherein the at least one processing component comprises hardware configured to execute software stored in the at least one memory component; wherein the software comprises an operating system and an application in the form of a non-transitory computer readable medium having a computer readable program code embodied therein; wherein the application is under the control of the at least one processing component; wherein the non-transitory computer readable medium is under the control of the at least one processing component and wherein the non-transitory computer readable medium provides a problem of interest and identifies suitable domain data sets; and wherein the non-transitory computer readable medium is configured to apply a symbolic thinking engine to create one or more explanatory theories.

The AI system described above may further comprise a domain experiment component that is operatively connected to the at least one processing component and the at least one memory component; wherein the domain experiment component is configured to receive, from the at least one memory component, a description of one or more experiments to be run and to receive, from the at least one processing component, a command to begin the one or more experiments.

In at least one embodiment, the domain experiment component is configured to transmit results from the one or more experiments to the at least one memory component.

The application described above herein may also be configured to utilize a plurality of symbols, a plurality of rules governing the behavior of the plurality of symbols, and/or methods for assessing how well the plurality of symbols represents a data sample.

In additional embodiments, the application is configured to utilize data sets from a problem of interest and/or related data sets from problems similar to the problem of interest.

The application in some embodiments may further be configured to utilize a configuration file dictating how newly-generated experiments are specified and how results from the newly-generated experiments are parsed.

The application may additionally be configured to utilize one or more algorithms.

Embodiments of the present invention include an artificial intelligence (AI) method, the method comprising: choosing a problem space comprising at least one problem to be solved and target data relating to the at least one problem; identifying related data with respect to the problem space; generating and/or modifying an explanatory theory for the at least one problem; testing the explanatory theory against the target data; determining whether the explanatory theory adequately explains the target data; and returning a result solving the at least one problem.

The choosing step of the AI method may further comprise: selecting a set of symbols from which the explanatory theory can be constructed; selecting a set of rules that enumerate valid combinations of one or more symbols in the set of symbols; and/or determining functionality needed to assess how well the explanatory theory explains the target data. In some embodiments, the choosing step further comprises utilizing one or more algorithms.

The identifying step of the AI method may further comprise: comparing the target data to the related data to determine a probability that the target data is distributed identically to the related data.

The generating step of the AI method may additionally comprise: applying one or more grammar induction algorithms to both the target data and the related data. The one or more grammar induction algorithms may be selected from the group consisting of: Monte Carlo Tree Search, genetic algorithms, and combinations thereof.

In some embodiments, the AI method described above herein may further comprise: identifying shortcomings of the explanatory theory; and utilizing the shortcomings to modify the explanatory theory at the generating step. The AI method may also comprise: performing one or more experiments to identify whether the explanatory theory is valid.

Additionally, the performing step of the AI method may comprise generating new data not in either the target data or the related data; and testing the explanatory theory to see if the explanatory theory fits the new data.

In some embodiments, the AI method also comprises: augmenting the related data with additional data if the explanatory theory does not adequately explain the target data. The AI method may further comprise: obtaining additional context for the problem space to enhance usability of the result.

Some embodiments of the present invention include an artificial intelligence (AI) method, the method comprising: choosing a problem space comprising at least one problem to be solved and target data relating to the at least one problem; identifying related data with respect to the problem space; generating and/or modifying an explanatory theory for the at least one problem; testing the explanatory theory against the target data; determining whether the explanatory theory adequately explains the target data; repeating the generating, testing, and determining steps until the explanatory theory is an adequate explanatory theory that explains the target data; and utilizing the adequate explanatory theory to return a result solving the at least one problem.

The one or more algorithms described above herein may be selected from the group consisting of: Monte Carlo Tree Search, Tree Parzen Estimators, Sequential Model Based Optimization, and combinations thereof.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments of the disclosure will be more particularly described in conjunction with the following drawings wherein.

DETAILED DESCRIPTION

Figure 1:
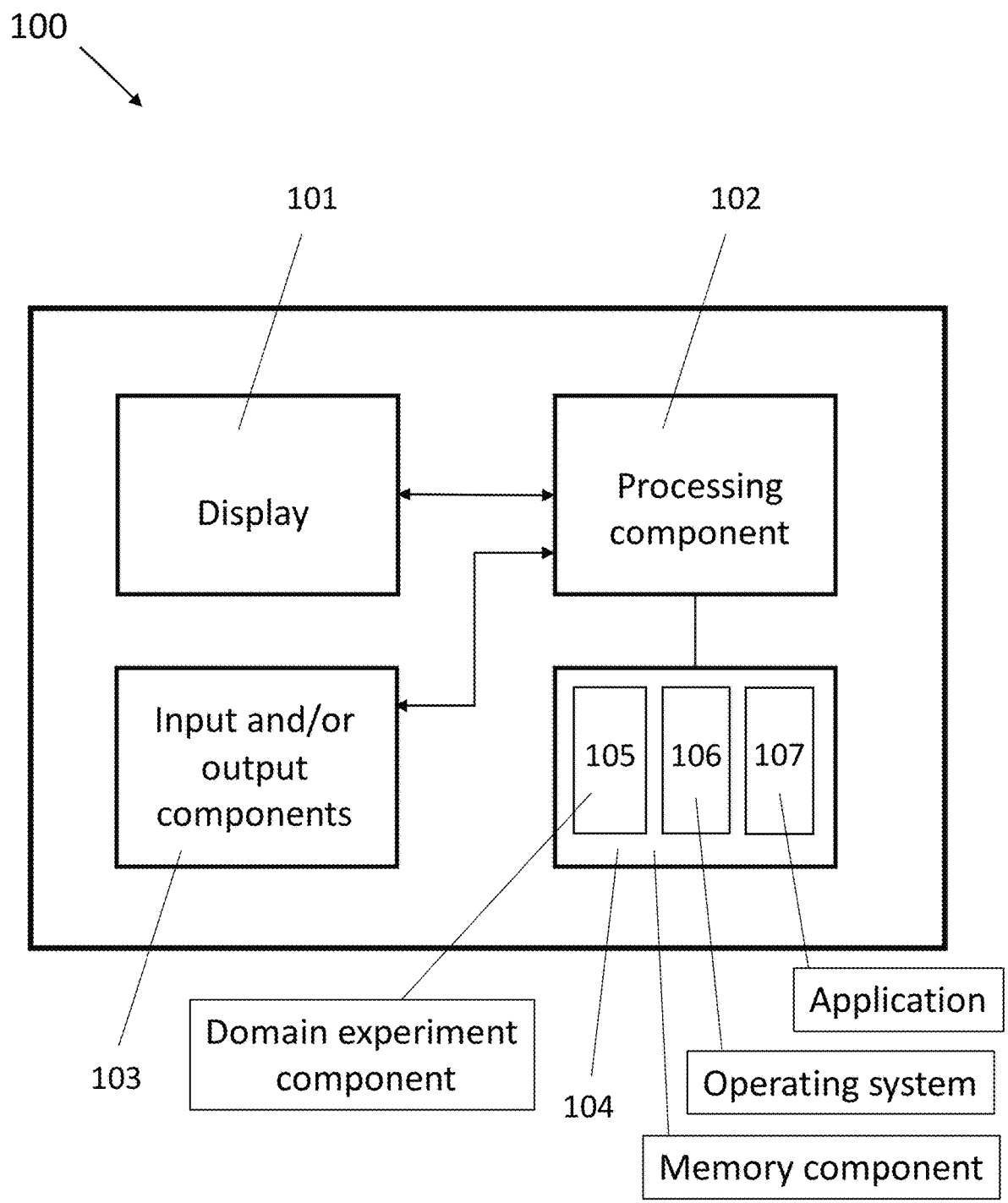
FIG. 1 is a depiction of an AI system, according to at least one embodiment of the present invention.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

The description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

In general, the word "instructions," as used herein, refers to logic embodied in hardware or firmware, or to a collection of software units, possibly having entry and exit points, written in a programming language, such as, but not limited to, Python, R, Rust, Go, SWIFT, Objective C, Java, JavaScript, Lua, C, C++, or C#. A software unit may be compiled and linked into an executable program, installed in a dynamic link library, or may be written in an interpreted programming language such as, but not limited to, Python, R, Ruby, JavaScript, or Perl. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage. As used herein, the term "computer" is used in accordance with the full breadth of the term as understood by persons of ordinary skill in the art and includes, without limitation, desktop computers, laptop computers, tablets, servers, mainframe computers, smartphones, handheld computing devices, and the like.

In this disclosure, references are made to users performing certain steps or carrying out certain actions with their client computing devices/platforms. In general, such users and their computing devices are conceptually interchangeable. Therefore, it is to be understood that where an action is shown or described as being performed by a user, in various implementations and/or circumstances the action may be performed entirely by the user's computing device or by the user, using their computing device to a greater or lesser extent (e.g. a user may type out a response or input an action, or may choose from preselected responses or actions generated by the computing device). Similarly, where an action is shown or described as being carried out by a computing device, the action may be performed autonomously by that computing device or with more or less user input, in various circumstances and implementations.

Generally, the present invention is directed towards AI systems and methods that reason in a human style. In particular, embodiments of the invention construct an explanatory theory iteratively by generating potential explanations of data and filtering and/or modifying those explanations when provided with data that show the explanation to be inadequate.

In one or more embodiments, the present invention comprises the following general, non-limiting features: (1) creating one or more explanatory theories; (2) deciding on a "good" explanation/explanatory theory; (3) operating efficiently on sparse data; (4) performing causal reasoning; (5) having a modular construction; and (6) having a symbolic thinking engine.

Turning now to FIG. 1, an Artificial Intelligence (AI) system 100 is presented, according to at least one embodiment of the invention. The system 100 may be executed on a computing device, including, as non-limiting examples, a desktop computer, a portable, wearable, or tablet computer; a smartphone; a digital watch; and the like.

The system 100 comprises at least one display 101, at least one processing component 102, one or more input and/or output components 103, and at least one memory component 104. The above-mentioned components are connected with each other through connectors, lines, buses, cables, buffers, networks, modems, antennas, and/or other means known to those of ordinary skill in the art.

The at least one display 101 outputs data processed by the at least one processing component 102, including, for instance, images and text. The at least one display 101 may be a screen well-known to those of skill in the art, such as, for example, a liquid crystal display (LCD), a plasma display, a light-emitting diode (LED) video screen, or the like.

The one or more input and/or output components 103 are connected to the system 100 by means of a local interface. The one or more input and/or output components may comprise, for instance a keyboard, a scanner, a mouse, a microphone, a touchpad, a laser, a bar code, a radio frequency (RF) device reader, a printer, and/or combinations thereof.

The at least one processing component 102 may comprise computer hardware that is configured to execute software stored in the at least one memory component 104. The computer hardware of the at least one processing component 102 may further comprise, for example, a commercially-available processor such as a general-purpose processor, a central processing unit (CPU), a microprocessor, any other processor element suitable for executing software instructions known to those of ordinary skill in the art, and/or combinations thereof.

The at least one memory component 104 may comprise both a volatile memory component (such as, for instance, random-access memory (RAM)) and a non-volatile memory component (such as, for example, read-only memory (ROM), a hard drive, a CD-ROM, a DVD, and/or any other non-volatile memory known to a skilled artisan). In further aspects of the present invention, the at least one memory component may be either a remote server or a cloud-based system that is remotely accessible by the system 100.

The at least one memory component 104 is operatively connected to the at least one processing component 102, such that the at least one processing component can read and write information from/to the at least one memory component 104. In a further aspect of the present invention, the at least one memory component 104 may, in some embodiments, be integrated into the at least one processing component 102.

Optionally, a domain experiment component 105 is present and is operatively connected to the at least one processing component 102 and the at least one memory component 104. The domain experiment component 105 receives a description of the experiment to be run from the at least one memory component 104 and a command to begin the experiment from the processing component 102. The domain experiment component may, in at least one embodiment, determine the binding affinity of molecules designed by the system 100 to a given target molecule by running a physical experiment or by running external hardware with a set of executed code set by the system. The results are then transmitted to the at least one memory component 104 for use elsewhere in the system 100.

The software stored in the at least one memory component 104 comprises an operating system 106 and an application 107 in the form of a non-transitory computer readable medium having a computer readable program code embodied therein. The operating system 106 controls the execution of the application 107. The operating system 106 may be any operating system known to a skilled artisan, such as, for instance, a proprietary operating system or a commercially or freely available operating system, including, but not limited to, WINDOWS®, MAC OS®, LINUX®, and ANDROID®.

The application 107 in the form of a non-transitory computer readable medium is under the control of the at least one processing component 102. The application may utilize the following inputs: (1) user provided "modules" that consist of symbols, the rules the govern their interactions, and methods for assessing how well or poorly a combination of symbols represents a sample of data, (2) data sets from the problem of interest and/or related data sets from similar problems as identified by the user, (3) if the application 107 is allowed to generate new experiments, a configuration file dictating how experiments are specified and results parsed, and (4) algorithmic parameters used by the AI system.

Figure 2:
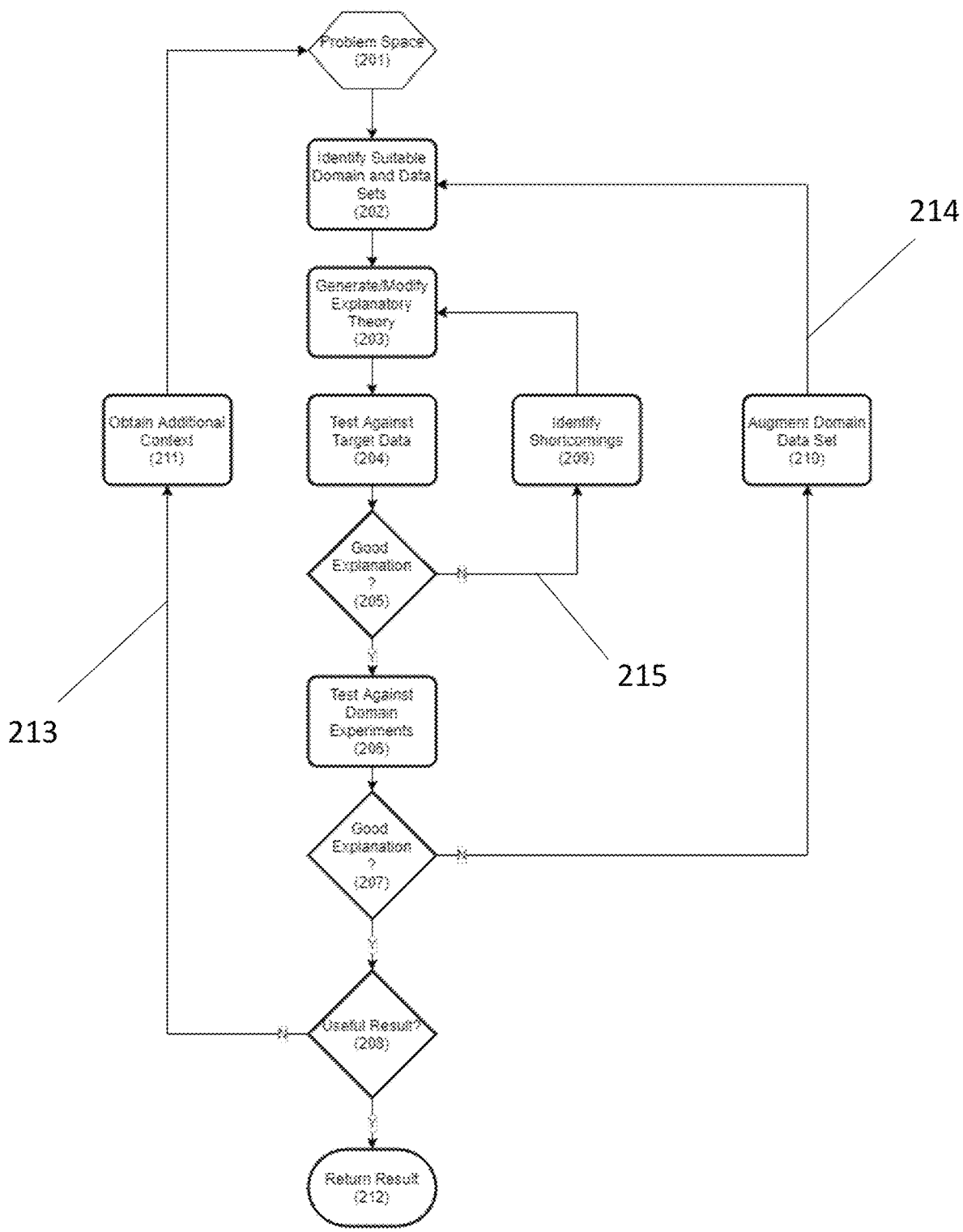
FIG. 2 is a flow chart depicting an AI method, according to at least one embodiment of the present invention.

In at least one embodiment, the application 107 implements a graphical user interface and other supporting software, but it is also responsible for running an implementation of the AI method 200 shown in FIG. 2. The method 200 operates in an iterative fashion with the three main logic loops (213, 214, and 215) shown. The outermost loop 213 finds the most appropriate application domain and supporting data for the given application. Accordingly, the loop 213 encompasses, at minimum, steps 201, 202, 203, 204, 205, 208, 211, and 212. The next loop 214 is optional depending on whether the domain experiment component 105 is present; if so, this loop focuses on extending the data available to the system by proposing and running domain experiments, and encompasses, at minimum, additional steps 206, 207, and 210. The final and innermost loop 215 focuses on modifying the explanatory theories generated by the method to best fit the available data. This innermost loop encompasses, at minimum, additional step 209.

The first step in the method 200 is to choose an appropriate problem space 201. In at least one embodiment, choosing such a space requires the selection of a domain module, which defines: (1) the set of symbols from which explanatory theories are constructed, (2) a set of rules that enumerate the valid combinations of these symbols, (3) the functionality needed to assess the "goodness" of an explanatory theory against a piece of data, and (4) relevant data sets for training the AI system. The symbols and rules included in a module may, but need not, be defined as a "formal grammar" that, as is commonly known in the art, consists of a set of symbols and the corresponding rewrite rules.

As a non-limiting example, assume that the domain module relates to the generation of a ribonucleic acid (RNA) sequence. The symbols could then be defined as A, C, G, and U for the adenine, cytosine, guanine, and uracil molecules that comprise RNA, as well as the "nonterminal" symbols S, L, and F which do not appear in the RNA sequence. Finally, the placeholder variables s and (d, $\hat{d}$) are used to denote unpaired nucleotides and pairs of nucleotides, respectively. The symbol →denotes "replaced by" and | denotes exclusive or. The aforementioned notation will be familiar with those of skill in the art. Given these definitions, the rules for the symbol combinations are as follows:

$$S \rightarrow SL | L$$

$$L \rightarrow s | dF\hat{d}$$

$$F \rightarrow dF\hat{d} | LS$$

$$S \rightarrow A | C | G | U$$

$$(d,\hat{d}) \rightarrow (A,U) | (U,A) | (C,G) | (G,C) | (G,U) | (U,G)$$

Figure 4:
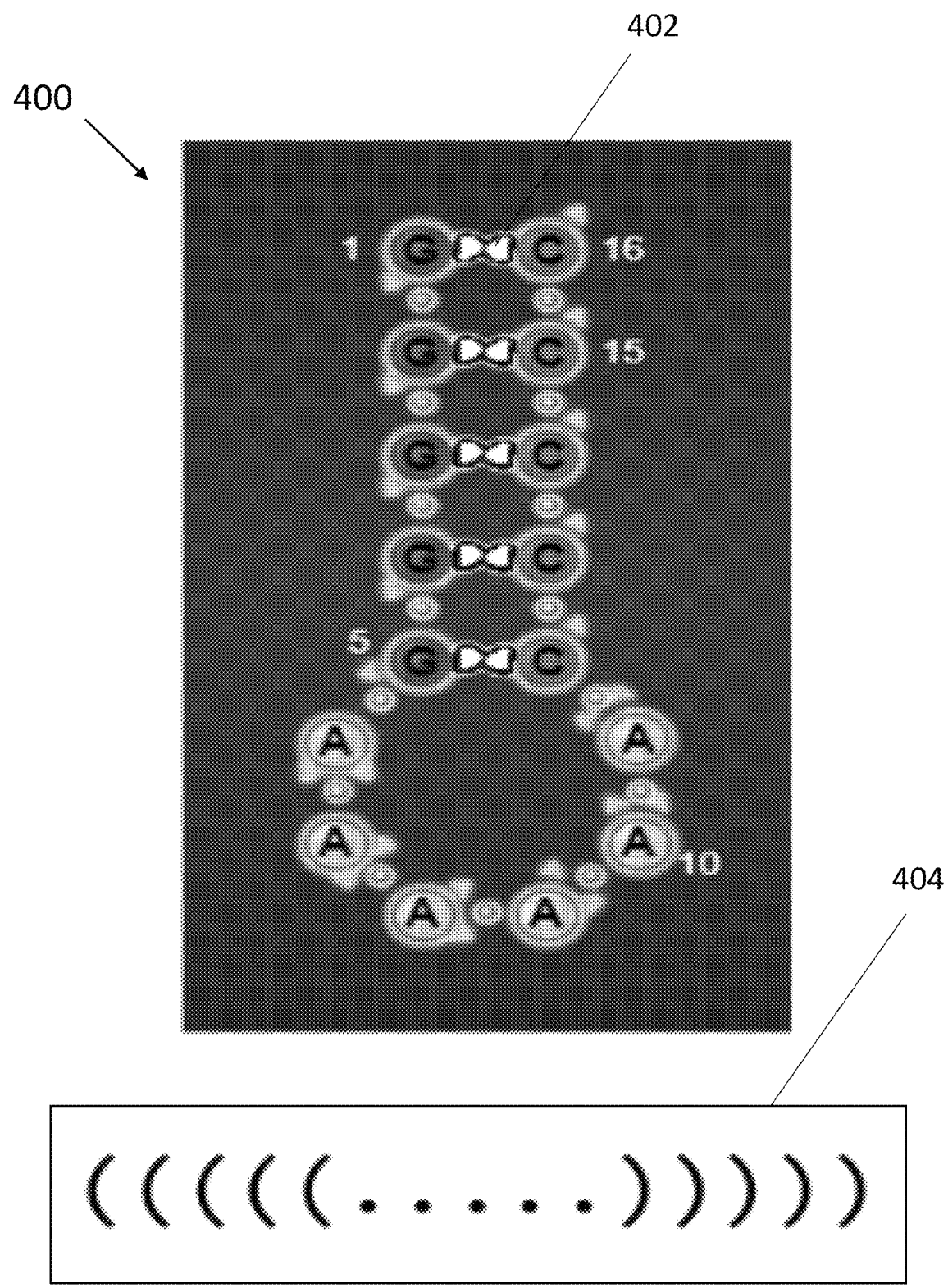
FIG. 4 is a depiction of a sample ribonucleic acid (RNA) sequence that can be subject to a hierarchical representation, according to an embodiment of the present invention.
Figure 5:
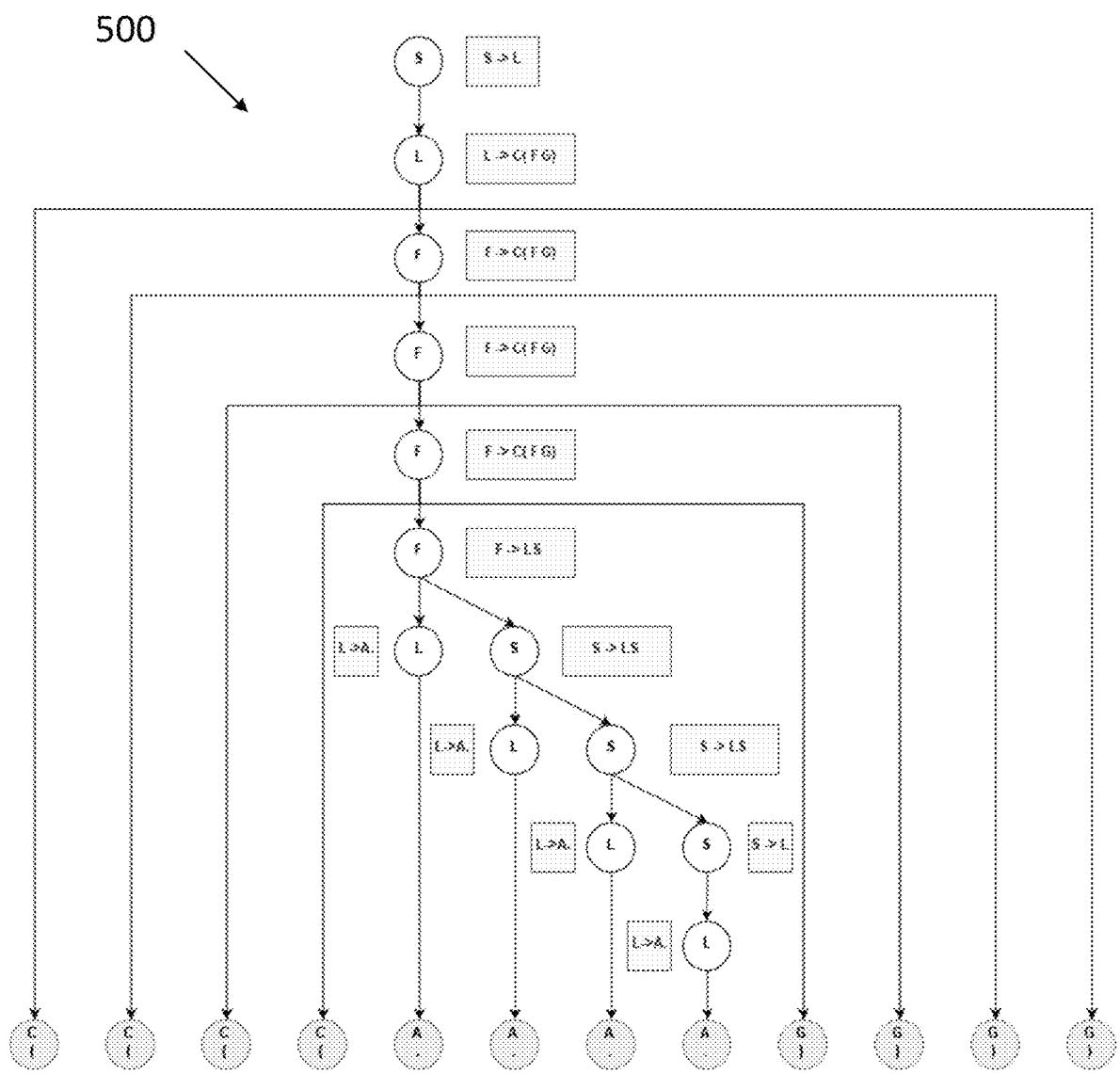
FIG. 5 is a depiction of a sample hierarchical representation for the sample RNA sequence shown in FIG. 4, according to an embodiment of the present invention.

The rules shown above can be combined to create a hierarchical representation of an RNA sequence. For example, FIG. 4 shows a sample RNA sequence 400 along with its secondary structure 402, which describes the pairs of nucleotides that are bonded via hydrogen bonds. This secondary structure can also be represented in standard "dot-bracket" notation 404. FIG. 5 shows the representation of the same RNA sequence and secondary structure in FIG. 4 using the symbols and rules of the grammar defined above. The grammatical representation 500 enables any RNA sequence to be represented as a "tree" starting with the symbol "S" and where each leaf is a nucleotide or a pair of hydrogen-bonded nucleotides. It should be noted that the non-terminal symbols S, F, and L do not necessarily correspond to physical components of the RNA, but serve as intermediate steps in constructing the RNA.

The functionality needed to assess the "goodness" of a theory is commonly referred to as the objective function. It could include, but is not limited to, a physics-based computational code for computing the structure of an RNA sequence and a second code to quantify the difference between the structure predicted by the explanatory theory and the one predicted by the physics-based code. There are many physics based codes for simulating RNA folding such as ViennaRNA (see, e.g., R. Lorenz et al., "ViennaRNA Package 2.0," Algorithms for Molecular Biology: 6:26 (2011)) and mfold (see, e.g., M. Zuker, "Mfold web server for nucleic acid folding and hybridization prediction," Nucleic acids research 31.13 (2003): 3406-3415) though the "best" choice of algorithm can be problem specific. Similarly, there are multiple algorithms for comparing RNA sequences and their secondary structures ranging from "counting" the number of mismatched elements to "base pair distances" as implemented in Lorenz (2011). In both cases, the smaller the difference, the greater the "goodness" of the theory. It should be appreciated, however, that further qualitative definitions are also possible. This collection of symbols, rules and goodness assessment functionality constitutes an RNA generation domain module.

The last component of the domain module are the sets of related data, which may be used to help build an explanatory theory as described later in the process. For the aforementioned domain module, a related set of data will consist of RNA sequences and their associated structures with a concrete example being the RNAStrand database (see, e.g., M. Andronescu et al., "RNA STRAND: the RNA secondary structure and statistical analysis database," *BMC bioinformatics* 9.1 (2008): 340). An example from this database is as follows: GGGGAUGUUAUUGGCUUCGACGCUG-GUGAUGAAGCUCAUAGAUGCAUGCCGAGAGCG-CAUUUUCUCUCGUAAAUAAA AUUUGCAUUUUA-AUAGUCGCAAACGACGAAACUUACGCUC-UAGCUGCCUAAGGGCAGUUUGUCCGCUUCCUA-GAAUA CUUGUGGUUUAGGAACCCGACCGU-AGCGCACGCACACAAGUCCGUAUAGAGUCAAGC-CUCGGGGCUUUAUACCAAAC UUAGAGGAUCG-CAUCUUGUACCCUGUUCGUCGGGUCACUGGGU-GUUAAAACAAUAGACGAUAUCUAAGCAUGUAGU-A UUCUCGAGUGUAGUGCUGGCGGACGCGGGUU-CAACUCCCGCCAUCUCCACCA
((((((...............((((((.(...((((...(((((((((((([[[[..
(.((((.]]]]].....)))                   )).)...............
(..(.(((((((..)))))))).)..)....(((((.
((....)).))))))...(.....((.......)).....)..................     .........
(((((.((...((({.{.{{{))).....))))))............}}}...}.}...))))))...))   ))...
))))..).).))))))))...(((((.......)))))))))))))....

This provides the sequence and structure in dot-bracket notation as shown previously, with respect to a different sequence, in FIG. 4. RNAStrand contains natural RNA sequences and their structures, and other related datasets may have the same information derived from synthetic sequences or tests like the Eterna100 (see, e.g., J. Anderson-Lee et al., "Principles for predicting RNA secondary structure design difficulty," *Journal of molecular biology* 428.5 (2016): 748-757), which are unnatural but designed to be challenging for existing tools. They do, however, all use the dot-bracket format shown above.

It should be noted that domain modules can share components. For example, it is common for multiple domain modules related to RNA to share everything but the grammar used to construct RNA sequences. In particular, one subtle but important change is converting the grammar above to $$xSy \rightarrow SL | L$$

$$xLy \rightarrow s | dF\hat{d}$$

$$xFy \rightarrow dF\hat{d} | LS$$

$$S \rightarrow A | C | G | U$$

$$(d,\hat{d}) \rightarrow (A,U) | (U,A) | (C,G) | (G,C) | (G,U) | (U,G)$$

In this example, x and y are used as shorthand to distinguish multiple copies of a rule that depend on the neighboring symbols. For example, $$xSy \rightarrow SL | L$$

is expanded to many different rules $$ASA \rightarrow SL | L$$

$$ASU \rightarrow SL | L$$

$USA \rightarrow SL|L$ $CSA \rightarrow SL|L$ $ASC \rightarrow SL|L$ where ASA→SL|L is read "replace S with either SL or L if S is surrounded by two adenines (As)". The inclusion of this context sensitivity can boost performance because it allows rules to be used selectively based on their surroundings but also increases the computational cost.

One or more algorithms may be used to select the domain module with respect to the problem space 201. A skilled artisan will appreciate that a single problem space may have multiple domain modules (e.g., several different metrics to assess "goodness"). Such one or more algorithms may be user-defined and may include an exhaustive search (e.g., enumerating all possible domains), enabling the user to pick the domain, or a more focused search procedure, which focuses on domains that are expected to produce the best results. Non-limiting examples of suitable algorithms which are familiar to those in the art include, but are not limited to, (1) Monte Carlo Tree Search, (2) Tree Parzen Estimators, and (3) Sequential Model Based Optimization. Using the examples above, these algorithms would compare the performance of the simple "context-free" grammar presented initially and the more complex "context-sensitive" grammar described above. The performance of these two grammars on the target data both in terms of achieving higher objective scores and in the computational time would be used to determine if the tradeoff in performance is "worth it" in this case. For example, one may check if the context sensitive grammar produces better solutions in a statistically significant way, and if not default to the easier to evaluate context-free grammar.

The next step 202 is to identify a suitable set of "related" data. This is accomplished by comparing the target data provided by the user against the data sets associated with each domain module. Methods of comparison include, but are not limited to, statistical tests that determine the probability that the target data set is distributed identically to one of the data sets contained in the domain module.

After related data have been identified, step 203 is to generate and/or modify an explanatory theory. This step uses the related data, as well as issues identified with previous explanatory theories 209 and the target data to create and/or modify the existing explanatory theories generated by previous iterations of this process. Using the RNA domain as a non-limiting example, the issues that must be corrected could include nucleotides that are bonded in the explanatory theory but not in either a physics-based model or reality. The creation of theories can proceed in multiple ways including, but not limited to, the application of existing grammar induction algorithms to both the target data and the related data identified in step 202. These algorithms identify how frequently each of the rules in the domain module are used in these sets of data (see, e.g., J. Talton et al., "Learning design patterns with Bayesian grammar induction," Proceedings of the 25th annual ACM symposium on User interface software and technology (2012)). The induced grammar can then be used to propose a hierarchical combination of symbols such as the structure shown in FIG. 5, which is defined as an explanatory theory, for the available data, which consists of the target data along with any related data from the domain module. The identified shortcomings (e.g., components of the theory that result in low "goodness" scores) of the current set of explanatory theories result in them being adjusted using a "Darwinian" process of knowledge creation, a process known in the art which can be implemented in algorithms such as, for instance, Monte Carlo Tree Search (see, e.g., C. B. Browne, et al., "A survey of Monte Carlo tree search methods," IEEE Transactions on Computational Intelligence and AI in games 4.1 (2012): 1-43) or genetic algorithms (see, e.g., H. M. Pandey et al., "Genetic algorithms: concepts, issues and a case study of grammar induction," Proceedings of the CUBE International Information Technology Conference (2012)) to define the rules of the induced grammar or their particular application to a test case (e.g., selecting a particular grammatical rule to use if there are multiple options).

Figure 6:
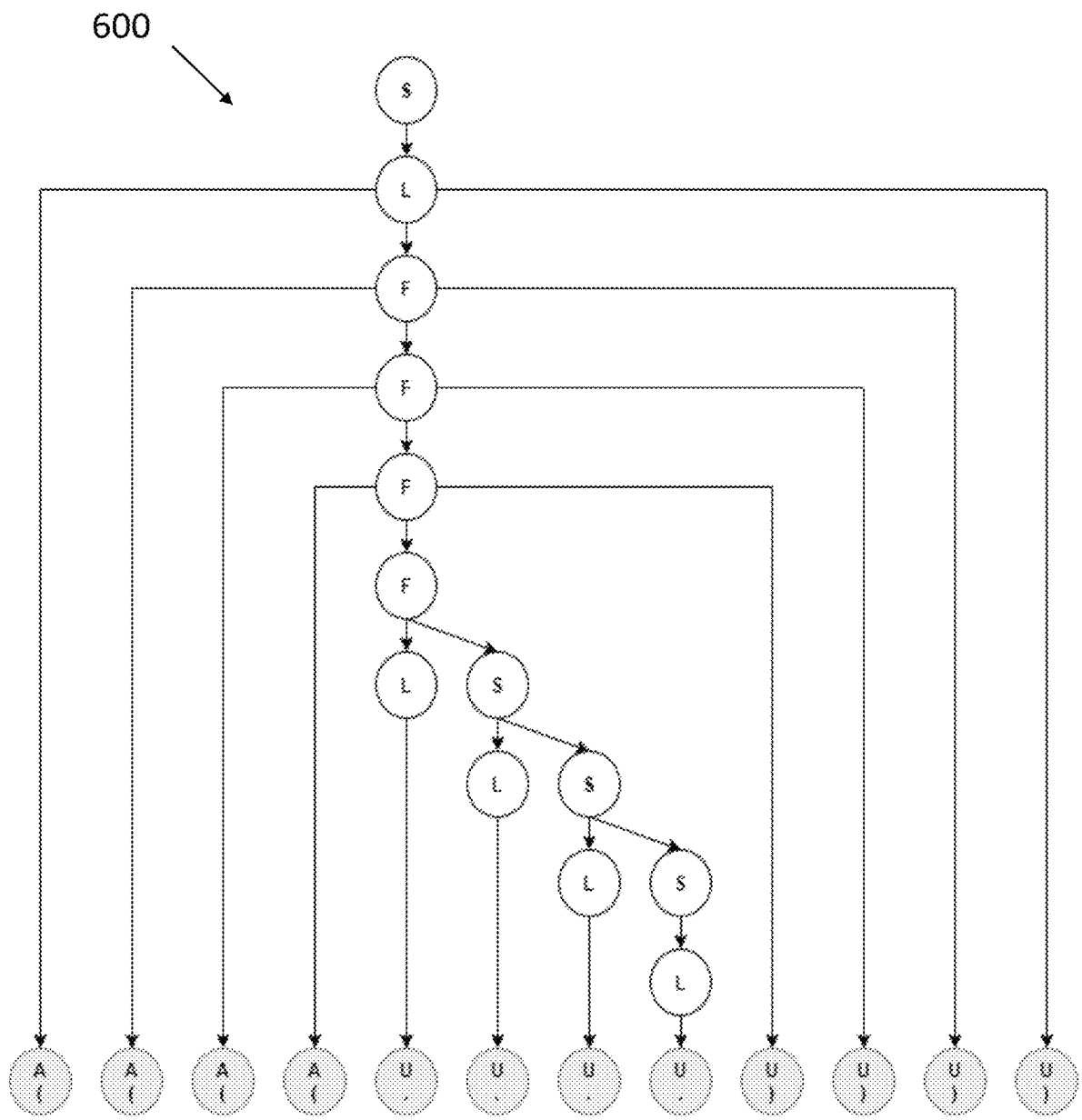
FIG. 6 is a depiction of a sample explanatory theory for the sample RNA sequence shown in FIG. 6, according to an embodiment of the present invention.
Figure 7:
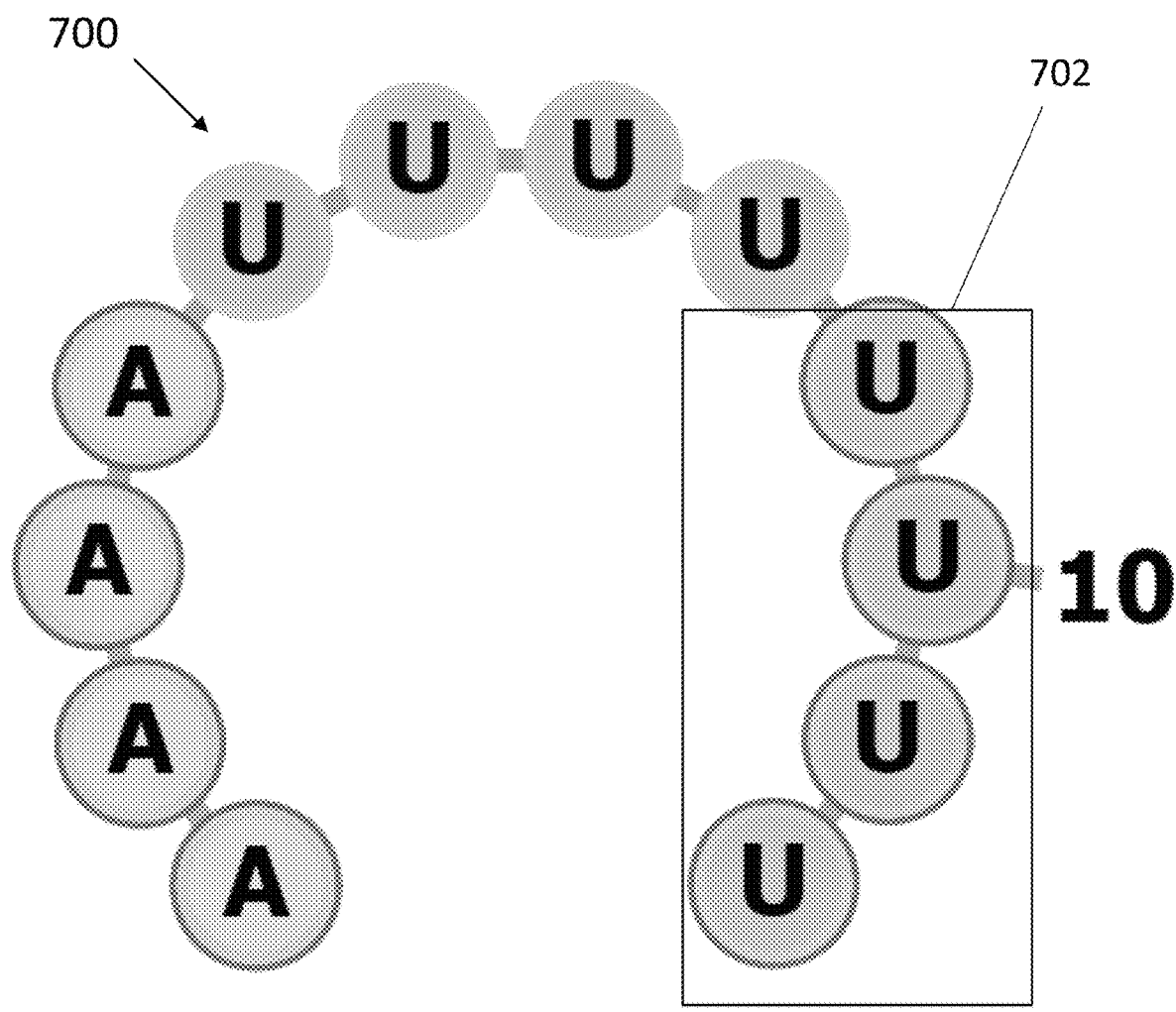
FIG. 7 is a depiction of a predicted RNA structure based on the sample explanatory theory shown in FIG. 6, according to an embodiment of the present invention.

Next, step 204 is to test against the target data. This step applies the generated/modified explanatory theories to the target data and tests their predictions against the module-specific definition of "good." For example, consider a domain module whose purpose is to construct RNA sequences given the target secondary structure shown in FIG. 4 (e.g., the inverse folding problem) using the formal grammar defined above as the explanatory theory. FIG. 6 shows an explanatory theory 600 for such a sequence, which is similar in structure to FIG. 5. However, when the sequence generated by the explanatory theory (AAAAUUUUUUUU) is provided to the RNA folding package ViennaRNA, the predicted structure 700, shown in FIG. 7, disagrees with the structure predicted by the explanatory theory. In particular, the sequence of nucleotides 702 are unpaired in the physics-based simulation but paired in the explanatory model. Accordingly, these nucleotides 702 are parts of the sequence whose structure in the physics-based model disagrees with the explanatory theory. Using the base pair distance as the metric, the "goodness" of this solution is −4 (a penalty for each missing pair).

If the current theories are determined to be sufficiently good as determined by a user-defined threshold (e.g., in step 205) or a computational budget has been exceeded, then the process exits the innermost loop. However, if the theory or theories are found lacking, these shortcomings are identified in step 209 and provided back to step 203. Using the RNA example provided previously as a non-limiting example, shortcomings could include parts of the RNA where the structure predicted by the explanatory theory and the structure predicted by a physics-based code disagree.

Figure 8:
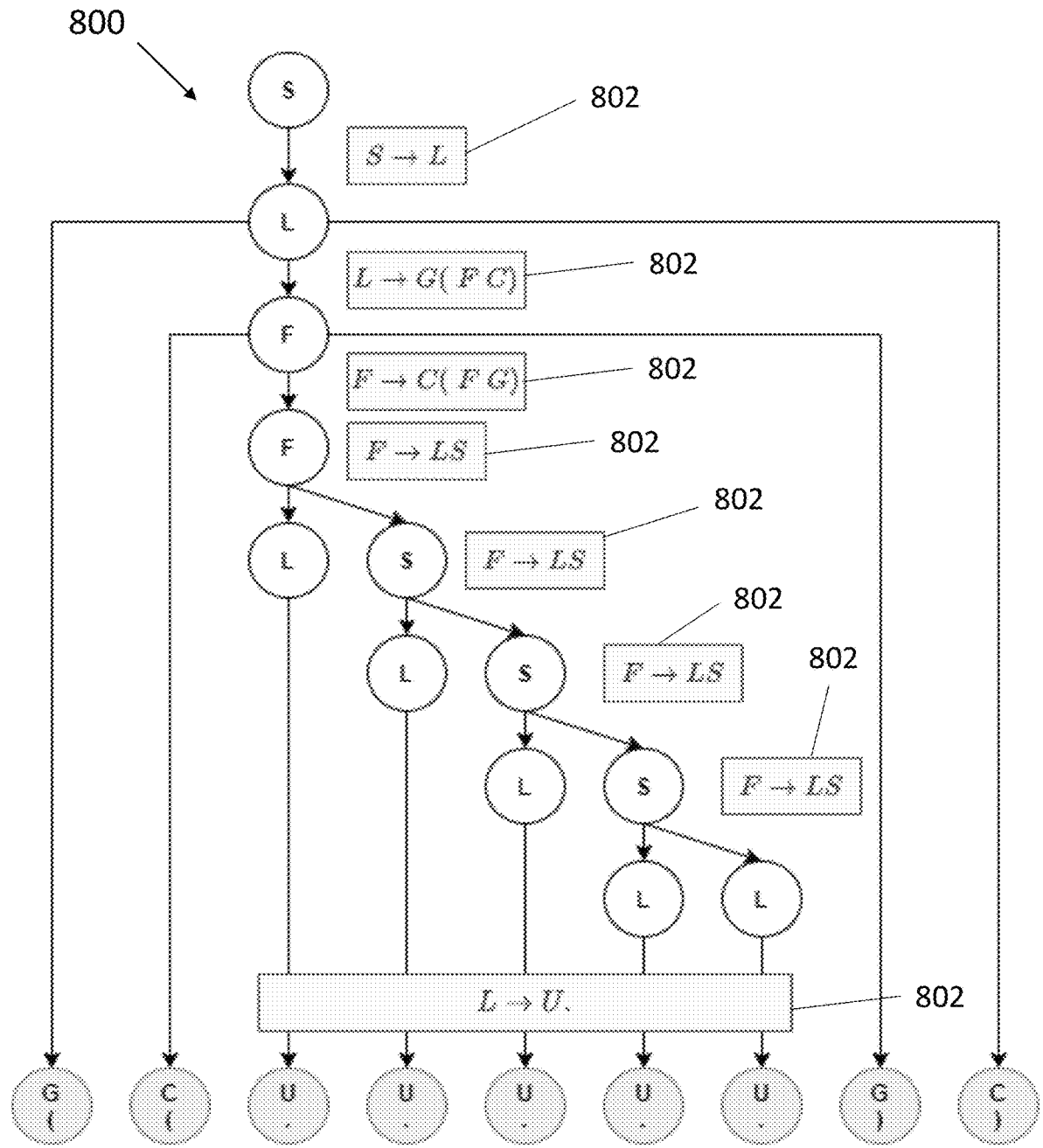
FIG. 8 is a depiction of another sample hierarchical representation for the sample RNA sequence shown in FIG. 4, according to an embodiment of the present invention.

If the target data were explained well ("goodness" value above the threshold), step 206 (Test Against Domain Experiments) will perform additional experiments to assess the validity of the explanatory theory if the domain experiment component 105 is available. This can be accomplished in multiple ways familiar to those with skill in the art, including, but not limited to, (1) generating novel (i.e., not in the target data or related data sets) examples from the grammar defined by the domain module and fine-tuned in step 203, or (2) drawing samples from regions with relatively sparse samples. For example, FIG. 8 shows the creation 800 of a novel strand of RNA and its secondary structure created by combining rules in the grammar provided above. Note that although FIG. 8 uses the same set of rules as FIG. 5, it selects rules in a different order as indicated by the boxes 802 and therefore results in a different RNA sequence/structure.

The domain experiment component 105 generates additional data for these new samples by running higher fidelity experiments. For example, rather than merely simulating the folding of an RNA strand, one could construct the RNA sequence in vitro and measure its folded shape. If the domain experiment component 105 is not present or the explanation of the target data is poor (due, e.g., to the inner loop terminating due to exceeding its computational budget), step 206 is non-operative.

If the samples generated at step 206 are explained well by the explanatory theories generated in step 203 (as determined by the module-specific objective function that defines the "goodness" of an explanation), the middle loop terminates at step 207, which again determines whether the theories are sufficiently "good." This loop will also terminate if a computational budget is exceeded or if step 206 is non-operative. If the explanatory theory is not sufficient (and at initial iterations they are expected to be poor), then the newly generated data from step 206 are added to a domain-specific data set in step 210. These data are typically stored in memory 104 in order to refine the explanatory theory in subsequent iterations. The reason for this additional step is avoid the problems associated with extrapolation in machine learning or AI systems. Extrapolation occurs when predictions are made in regions with few or even no data points, and often results in poor performance. By identifying these regions and "filling them in" with new examples, the system will retrain itself on a more complete data set in subsequent iterations.

Figure 9:
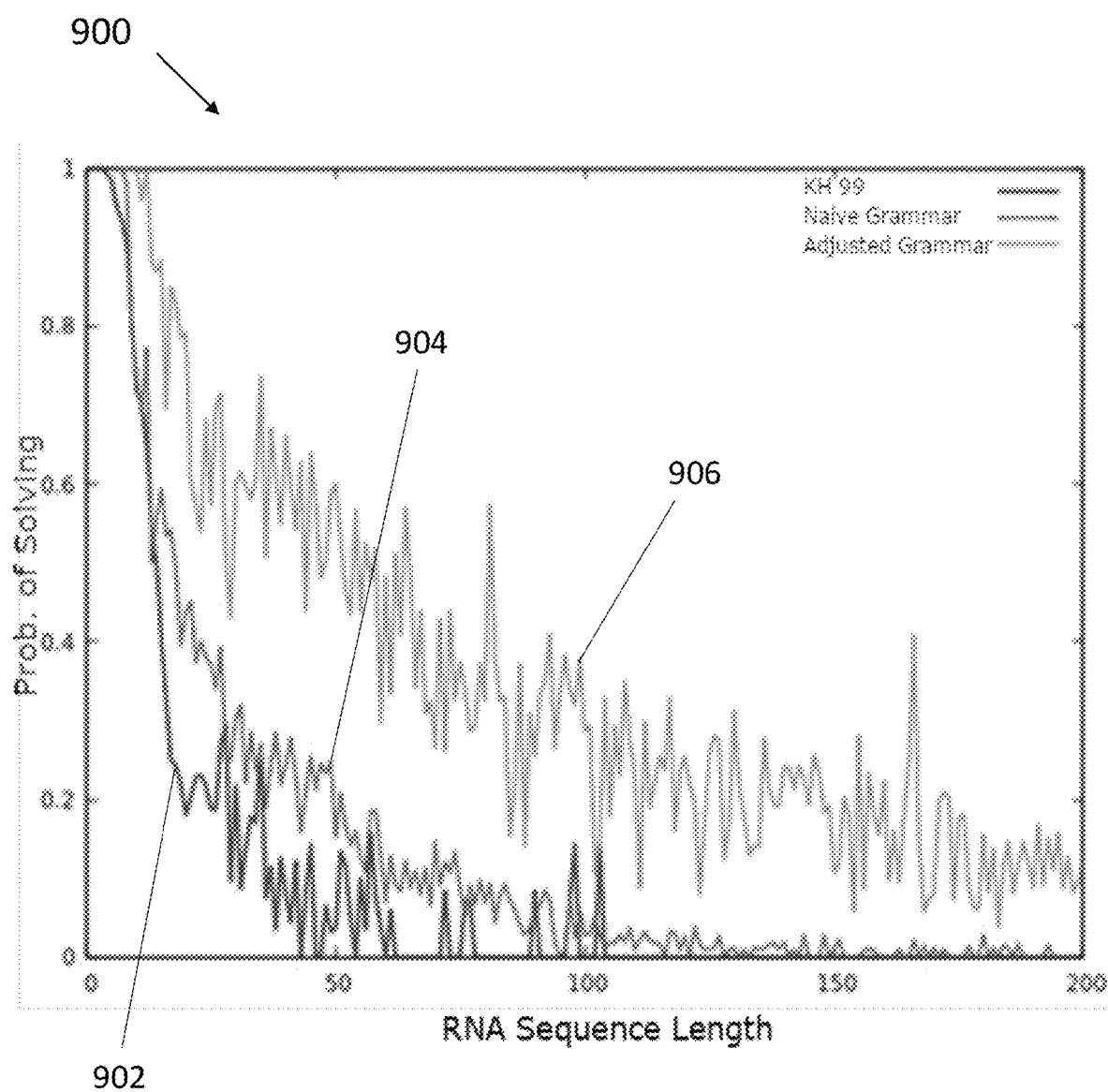
FIG. 9 is a graph displaying sample data demonstrating the performance of various domain modules, according to an embodiment of the present invention.

Next, step 208 determines whether there is a useful result. Specifically, the explanatory theories for the target data are either presented to the user or run through user-provided code that quantifies the performance of the explanatory theories as applied to the target data. Using the RNA example provided previously herein as a non-limiting example, step 208 could include the use of the RNA sequence included in the explanatory theories to detect the presence of a target molecule with the feedback indicating whether the molecule was detected or not. If deemed successful either by the user or by a user-defined criterion, the result is returned and the process terminates at the "Return Result" step 212. Otherwise, the feedback from the user is used to update the problem space and either selecting a different domain module or a different parameterization of the current module in step 211. In the RNA example, this feedback was elicited by presenting the user with results from three different domain modules with differing grammars. Although neither domain module was capable of producing an RNA sequence with the desired secondary structure, which was needed for a "useful" solution, their performance on the related data can also be used to assess them. FIG. 9 shows ancillary data 900 presented to the user demonstrating the performance of three domain modules highlighting the relative performance of three different grammars on the same set of "related data" contained in the domain module. KH99 (trace 902) is the grammar published in the literature (see, e.g., B. Knudsen et al., "RNA secondary structure prediction using stochastic context-free grammars and evolutionary history," Bioinformatics (Oxford, England) 15.6 (1999): 446-454) while the naïve (trace 904) and adjusted (trace 906) grammars are variants of the grammar with different propensities for using a particular rule in the grammar. Although none of the methods solved the problem at hand, the user can determine that the adjusted grammar is performing the best (e.g., successfully finding sequences with the target secondary structure) using the available data. They may then choose to continue to use this grammar or force the system to consider other alternatives if they believe the "related data" in the domain module is not representative of the target system.

Figure 3:
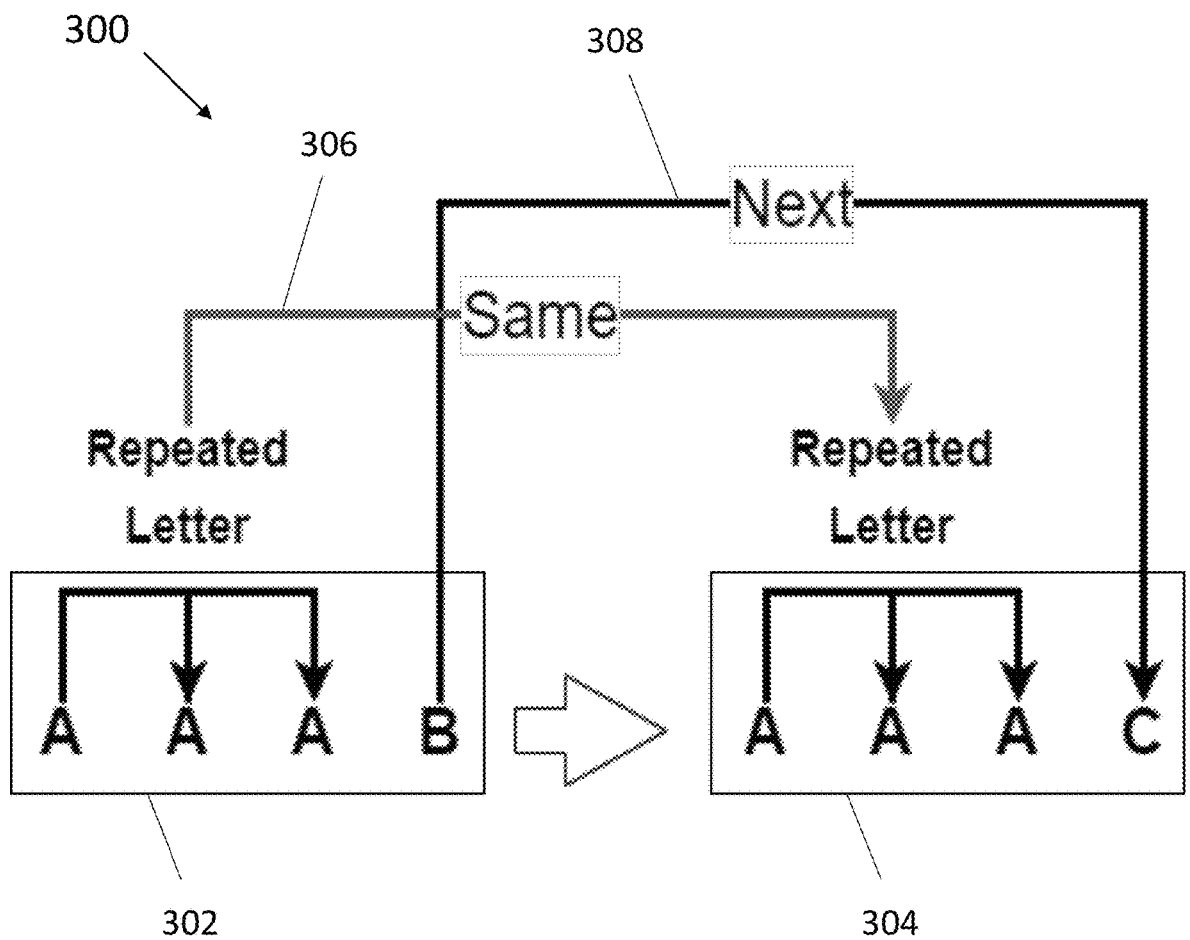
FIG. 3 is a depiction of a sample explanatory theory, generated according to at least one embodiment of the present invention.

Turning now to FIG. 3, a sample explanatory theory 300 is provided for the toy problem of a string letter analogy. The datum provided is the fact that the string of letters 302 ("AAAB") transforms into the string 304 ("AAAC"). The explanatory theory uses the following symbols: (1) the letters A through C, (2) the concept of a repeated letter group that contains multiple copies of the same letter, (3) the relationship "same" (306) indicating the letter or group on the left appears on the right, and (4) the relationship "next" (308) indicating that the letter or group on the right follows the letter or group on the left. Thus, the explanation of the datum is that it consists of a repeated set of three letters grouped into a repeated letter group with respect to both string 302 and string 304, and that the last letter in string 302 is replaced by the next letter in string 304 (i.e., B turns to C). Once developed, this explanatory theory could then be used to generate predictions, such as, for example, if the user provided a string "BBBD" and asked for an output, the string "BBBE" would be produced.

Accordingly, it should be appreciated that explanatory theories, such as the sample theory 300, may be generated using the methods and systems described herein, including, for instance, the method 200 described above in FIG. 2. During this process, assume the RNA modules are augmented by an analogy domain module that contains the following:

The symbols A-Z, which represent all the possible letters that may appear in the letter analogy and the symbol for ⇒ that divides the analogy into left- and right-hand sides.

The rules "Repeated Letter," which can combine two adjacent and identical letters on the same side or a repeated letter subtree with another adjacent letter contained within that tree, "Next," which replaces a letter on the left hand side with the next one in the alphabet on the right hand side, and "Same" which indicates a block that is unchanged in both the left and right hand sides of the analogy. There are also additional rules such as "Letter Sequence" indicating an ascending or descending sequence of letters on one side (e.g., ABC), but for brevity those are neglected here as they are not used in the example that follows.

The objective function here is to minimize the number of "ungrouped" symbols without any having any rules violated by the test data while maximizing the size of the connected components. In this context, an ungrouped symbol is a symbol A-Z that is not contained within a rule (e.g., not contained within a Same, Next, or Repeated Letter rule).

No data are provided with this domain module.

Following method 200:

In step 201, the problem space must be selected, which primarily involves selecting the domain module in step 202.

In step 202, assuming the domain modules consist of the RNA modules described above and an analogy module, we can immediately discard the RNA modules by noting that the target data contains a B and a ⇒, which cannot be represented by the symbols in the RNA modules. Thus, the only module is the analogy module. If multiple analogy modules were available, one would randomly select one as a start and compare the performance between subsequent iterations of the loop.

Figure 10:
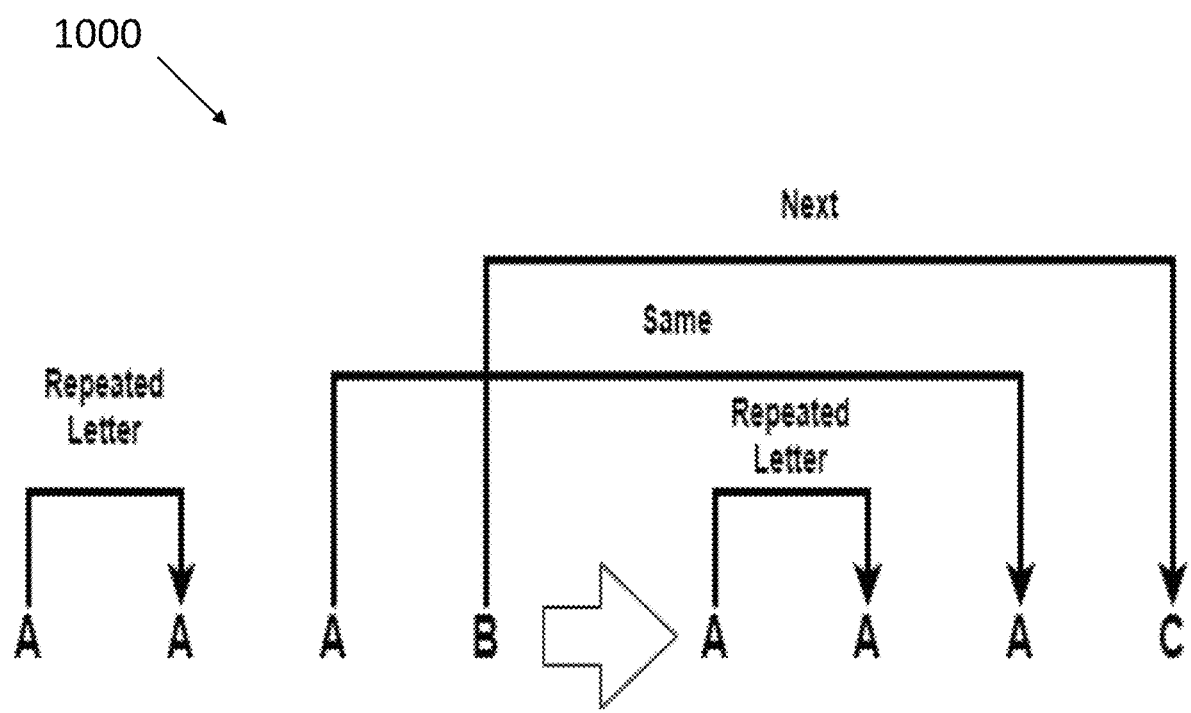
FIG. 10 is a depiction of an example of an initially-generated explanatory theory, according to an embodiment of the present invention.

In step 203, we generate an explanatory theory and apply it to the data in step 204. Because this is the first iteration, the explanatory theory must be generated from scratch. The initial construction of the theory will look to apply rules to any of the available symbols. As there is some ambiguity, these are chosen randomly. An example is shown in FIG. 10, which shows an explanatory theory 1000 after the initial pass of the inner loop.

In step 205, the quality of the explanation is assessed by evaluating the current explanatory theory using the objective function. In the example given in FIG. 10, there are no ungrouped symbols but the maximum size of a group is only 2.

Figure 11:
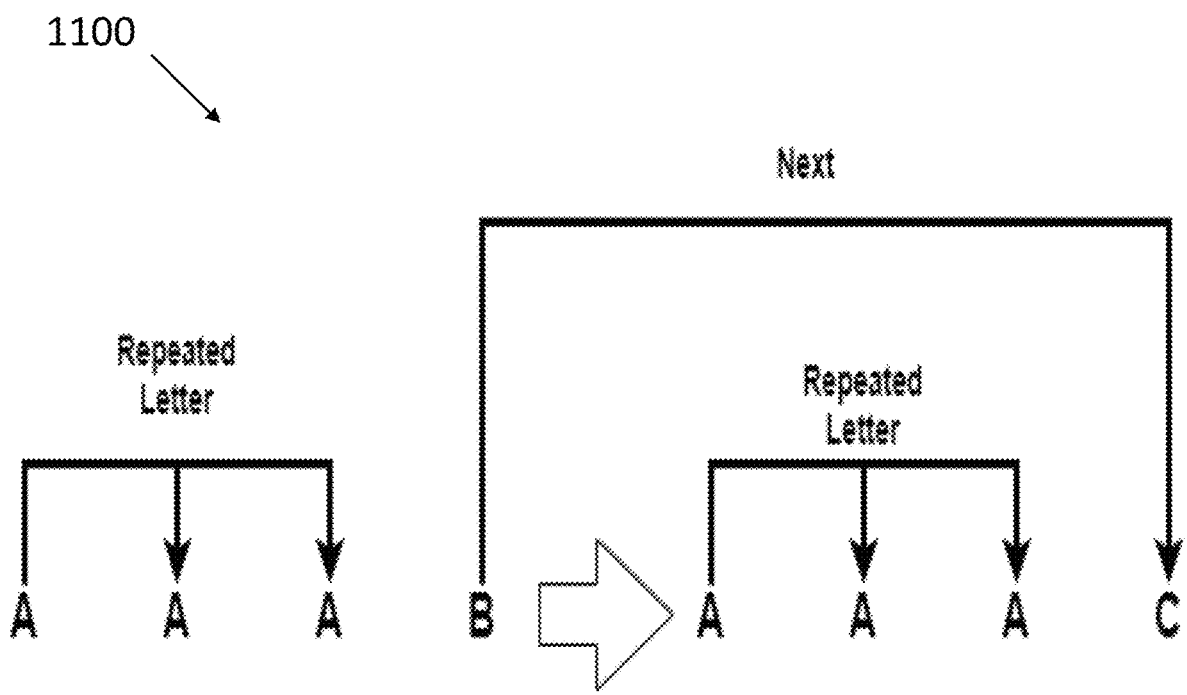
FIG. 11 is a depiction of an example of the explanatory theory shown in FIG. 10 after modification, according to an embodiment of the present invention.

In step 209, the method identifies shortcomings. In this case, it notes that the third "A" can be included into the repeated letter group. The theory is then modified in step 203 and, continuing the example shown in FIG. 10, the resulting explanatory theory 1100 is shown in FIG. 11 when applied to the target data in step 204.

In step 205, the explanatory theory is evaluated. As before, no symbols are ungrouped and the maximize size of a structure is 3 (AAA). In step 209, the system identifies that the repeated letter groups may be combined using a "Same" rule, which is applied in step 203 and then results in the explanatory theory shown above.

Steps 206 and 207 do not apply as there are no domain experiments to run.

In step 208, the explanatory theory is applied to the new example "BBBD" and produces the result "BBBE". This is presented to the user who can accept or reject the result. Assuming the user is satisfies the process terminates in step 212. If they are dissatisfied, they can provide additional context (step 211) potentially by providing new letter analogies for training, adjusting the weight given to ungrouped letters or the size of the largest structure, etc.

In summary, the AI systems and methods of embodiments of the present invention are capable of reasoning in a human-style by means of a symbolic thinking engine that generates explanatory theories, as well as a subsystem that filters explanations based on "goodness," which is defined by domain-general and domain-specific criteria. As an example of a domain specific criteria, consider FIG. 7 which encourages the designed sequences to exactly match the structure provided by the user. Fewer mismatches are considered better than more mismatches but assessing how well/poorly two structures match requires domain-specific knowledge. As an example of domain-general criteria, recall that all of the sequences generated are structured as a tree as shown in FIG. 6. A domain-general criteria is that these trees should be as small as possible, which reflects the general idea that explanations should be as simple as possible (with simpler explanations preferred over more complex ones).

The present invention in various embodiments has the ability to operate on both sparse and big data, and has a modular construction that allows generalization from specific domains. One or more embodiments of the present invention is capable of generating (1) useful results that provide actionable content (such as, for instance, RNA sequences that can detect a target molecule), (2) causal theories and explanations that are rationally derived and make sense, given the problem space and context, and (3) accurate predictions that reach beyond the domain in which they originated.

As a result, the present invention is capable of operating in ambiguous environments, including those with sparse and/or incomplete data, new or unseen situations and environments, and/or counterfactual dimensions.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

The invention claimed is:

1. An artificial intelligence (AI) method for solving at least one problem, the method comprising:
choosing, by at least one processor, a problem space comprising at least one problem to be solved and target data relating to the at least one problem;
defining, by the at least one processor, an objective function comprising a score reflecting how well any specific explanatory theory solves the at least one problem;
collecting, by the at least one processor, one or more sets of data from one or more databases, wherein the one or more sets of data are related to the at least one problem;
identifying, by the at least one processor, a first set of data from the one or more sets of data;
generating, by the at least one processor, an explanatory theory for the at least one problem using the first set of data;
testing, by the at least one processor, the explanatory theory against the target data by comparing one or more predictions of the explanatory theory against the objective function;
determining, by the at least one processor, whether the explanatory theory adequately explains the target data;
applying, by the at least one processor, the explanatory theory to generate a result solving the at least one problem;
displaying, by the at least one processor, the result to a user via a graphical user interface (GUI);
detecting, by the at least one processor, one or more shortcomings of the explanatory theory, the one or more shortcomings comprising one or more aspects of the explanatory theory having a score below a user-defined threshold;
utilizing, by an AI system, the one or more shortcomings to generate a modified explanatory theory without the one or more shortcomings,
training the AI system by operating efficiently on sparse data to generate a model that avoids overfitting, the training the AI system comprising:
the utilizing, by the AI system, the one or more shortcomings to generate the modified explanatory theory,
identifying context of the problem space with the sparse data,
generating the model, iteratively updating the context when the AI system obtains additional data relating to the problem space,
automatically identifying one or more regions of the problem space that lack sufficient data due to the one or more shortcomings,
extracting samples from the one or more regions of the problem space that lack the sufficient data, and
iteratively refining the model with the extracted samples.

2. The AI method of claim 1, wherein the choosing, by the at least one processor, the problem space further comprises:
selecting, by the at least one processor, a set of symbols from which the explanatory theory can be constructed; and
selecting, by the at least one processor, a set of rules that enumerate valid combinations of one or more symbols in the set of symbols,
wherein the objective function comprises a first set of computer-executable instructions for predicting a solution to the at least one problem, and a second set of computer-executable instructions for quantifying the score, wherein the score comprises a difference between the solution and the result generated by the explanatory theory,
wherein a syntax component contains the set of symbols and the set of rules.

3. The AI method of claim 2, wherein the choosing, by the at least one processor, the problem space is performed by one or more algorithms, wherein the defining, by the at least one processor, the objective function is performed by the one or more algorithms, wherein the one or more algorithms conduct a search based on one or more parameters, and wherein the one or more parameters comprises computation time.

4. The AI method of claim 3, wherein the one or more algorithms is selected from the group consisting of: Monte Carlo Tree Search, Tree Parzen Estimators, Sequential Model Based Optimization, and combinations thereof.

5. The AI method of claim 1, wherein the identifying, by the at least one processor, the first set of data further comprises:
comparing, by the at least one processor, the target data to the one or more sets of data by determining a probability that the target data is distributed identically to the one or more sets of data.

6. The AI method of claim 1, wherein the generating, by the at least one processor, the explanatory theory further comprises:
applying, by the at least one processor, one or more grammar induction algorithms to both the target data and the one or more sets of data.

7. The AI method of claim 6, wherein the one or more grammar induction algorithms is selected from the group consisting of: Monte Carlo Tree Search, genetic algorithms, and combinations thereof.

8. The AI method of claim 1, further comprising:
performing, by the at least one processor, one or more experiments to identify whether the explanatory theory is valid.

9. The AI method of claim 8, wherein the performing of one or more experiments to identify whether the explanatory theory is valid further comprises:
generating, by the at least one processor, new data from one or more sets of grammar, the new data not being present in either the target data or the one or more sets of data; and
testing, by the at least one processor, whether the explanatory theory explains the new data.

10. The AI method of claim 1, further comprising:
augmenting, by the at least one processor, the one or more sets of data with additional data if the explanatory theory does not adequately explain the target data.

11. The AI method of claim 1, further comprising:
obtaining, by the at least one processor, additional context for the problem space to enhance usability of the result.

12. An artificial intelligence (AI) method for solving at least one problem, the method comprising:
choosing, by at least one processor, a problem space comprising at least one problem to be solved;
selecting, by the at least one processor, a domain module from a plurality of domain modules for generating an explanatory theory to solve the at least one problem, wherein the domain module comprises:
a plurality of symbols from which the explanatory theory is constructed,
a plurality of rules that enumerate valid combinations of the plurality of symbols,
an objective function to quantify how well the explanatory theory explains a piece of data relating to the at least one problem, and
a plurality of training data sets relating to the at least one problem;
obtaining, by the at least one processor, target data from a user relating to the at least one problem;
comparing, by the at least one processor, the target data with the plurality of training data sets to identify a set of related data;
generating, by the at least one processor, the explanatory theory using the set of related data and the target data;
testing, by the at least one processor, the explanatory theory against the target data to obtain a score from the objective function;
when the score is above a user-defined threshold:
determining, by the at least one processor, that the explanatory theory is an adequate explanatory theory that explains the target data;
training an AI system with the determining, by the at least one processor, that the explanatory theory is the adequate explanatory theory that explains the target data;
when the score is below the user-defined threshold:
identifying, by the at least one processor, one or more shortcomings of the explanatory theory;
utilizing the one or more shortcomings of the explanatory theory to repeat (i) the generating by the at least one processor, the explanatory theory using the set of related data and the target data, (ii) the testing by the at least one processor, the explanatory theory against the target data to obtain the score from the objective function, and (iii) the determining, by the at least one processor, that the explanatory theory is the adequate explanatory theory that explains the target data, until the explanatory theory is the adequate explanatory theory;
training the AI system with the utilizing the one or more shortcomings of the explanatory theory;
utilizing, by the at least one processor, the adequate explanatory theory to return a result solving the at least one problem; and
displaying, by the at least one processor, the result to the user on a graphical user interface (GUI),
wherein both (i) the training the AI system with the determining, by the at least one processor, that the explanatory theory is the adequate explanatory theory that explains the target data, and (ii) the training the AI system with the utilizing the one or more shortcomings of the explanatory theory are performed by operating efficiently on sparse data to generate a model that avoids overfitting, and further comprise:
combining the target data with the plurality of rules to identify context of the problem space with the sparse data,
determining a subset of symbols in the plurality of symbols to generate the model,
iteratively updating the context when the AI system obtains additional data relating to the problem space.

13. The AI method of claim 12, wherein the comparing, by the at least one processor, the target data is performed by one or more statistical tests that determine a probability that the target data is distributed identically to at least one of the data sets in the plurality of training data sets.

14. The AI method of claim 12, wherein the one or more shortcomings are defined by a score from the objective function that is below the user-defined threshold.

15. The AI method of claim 12, wherein the domain module relates to generation of a ribonucleic acid (RNA) sequence.

16. The AI method of claim 1, wherein the one or more data sets contain incomplete information with respect to the at least one problem.

17. The AI method of claim 12, wherein the plurality of symbols and the plurality of rules embody human knowledge about the problem space and can be used for the generation of the explanatory theory when the plurality of training data is incomplete.

18. The AI method of claim 1, wherein the determining, by the at least one processor, whether the explanatory theory adequately explains the target data further comprises:
quantifying, by the at least one processor, the explanatory theory as applied to the target data by either (i) running, by the at least one processor, the explanatory theory through additional data provided by the user, or (ii) running, by the at least one processor, the explanatory theory through computer code provided by the user.

19. The AI method of claim 1, wherein the training the AI system further comprises:
updating the model until the AI system determines that the model is as simple an explanation as possible for the at least one problem.

20. The AI method of claim 1, further comprising:
storing, by the at least one processor, the additional data relating to the problem space;
iteratively refining, by the at least one processor, the modified explanatory theory with the additional data to generate further improved explanatory theories.

21. The AI method of claim 1, further comprising:
terminating, by the at least one processor, the utilizing the one or more shortcomings to generate the modified explanatory theory when a computational budget has been exceeded, and
wherein the training the AI system further comprises:
terminating the iteratively refining the model with the extracted samples when the computational budget has been exceeded.

22. The AI method of claim 12, wherein the at least one problem comprises a correct folding structure of a given nucleic acid sequence such that the given nucleic acid sequence detects a target molecule,
wherein the domain module relates to nucleic acid sequence generation,
wherein the set of related data comprises a plurality of nucleic acid sequences related to the given nucleic acid sequence, and one or more structures associated with the plurality of nucleic acid sequences, and
wherein the one or more shortcomings comprise inappropriately bound nucleotides in the given nucleic acid sequence that create an incorrect folding structure,
the method further comprising:
simulating, by the explanatory theory, folding of the given nucleic acid sequence to generate a simulated folded structure.

23. The AI method of claim 22, further comprising:
running, by the at least one processor, one or more experiments to generate the additional data,
wherein the one or more experiments comprise determining a binding affinity of the simulated folded structure to the target molecule.

* * * * *